Nov. 23, 1948.　　　　　G. E. LINNERT　　　2,454,325
COMBUSTION CUTTING OF STAINLESS STEEL
Filed Feb. 17, 1947　　　　　　　　　　2 Sheets-Sheet 1
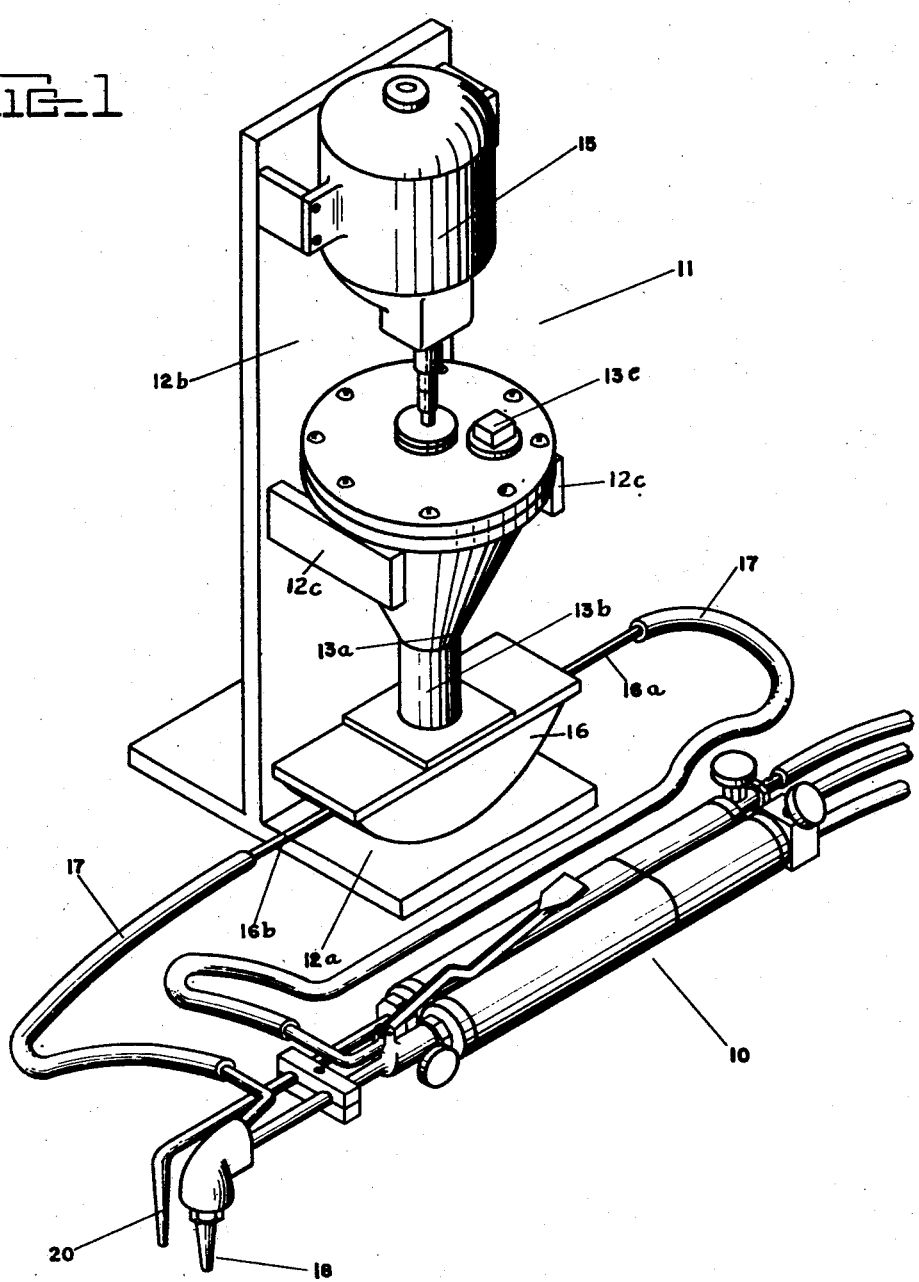
INVENTOR.
GEORGE E. LINNERT
BY John Howard Joyet
His Attorney.

Nov. 23, 1948.　　　　G. E. LINNERT　　　2,454,325
COMBUSTION CUTTING OF STAINLESS STEEL
Filed Feb. 17, 1947　　　　　　　　　　2 Sheets-Sheet 2
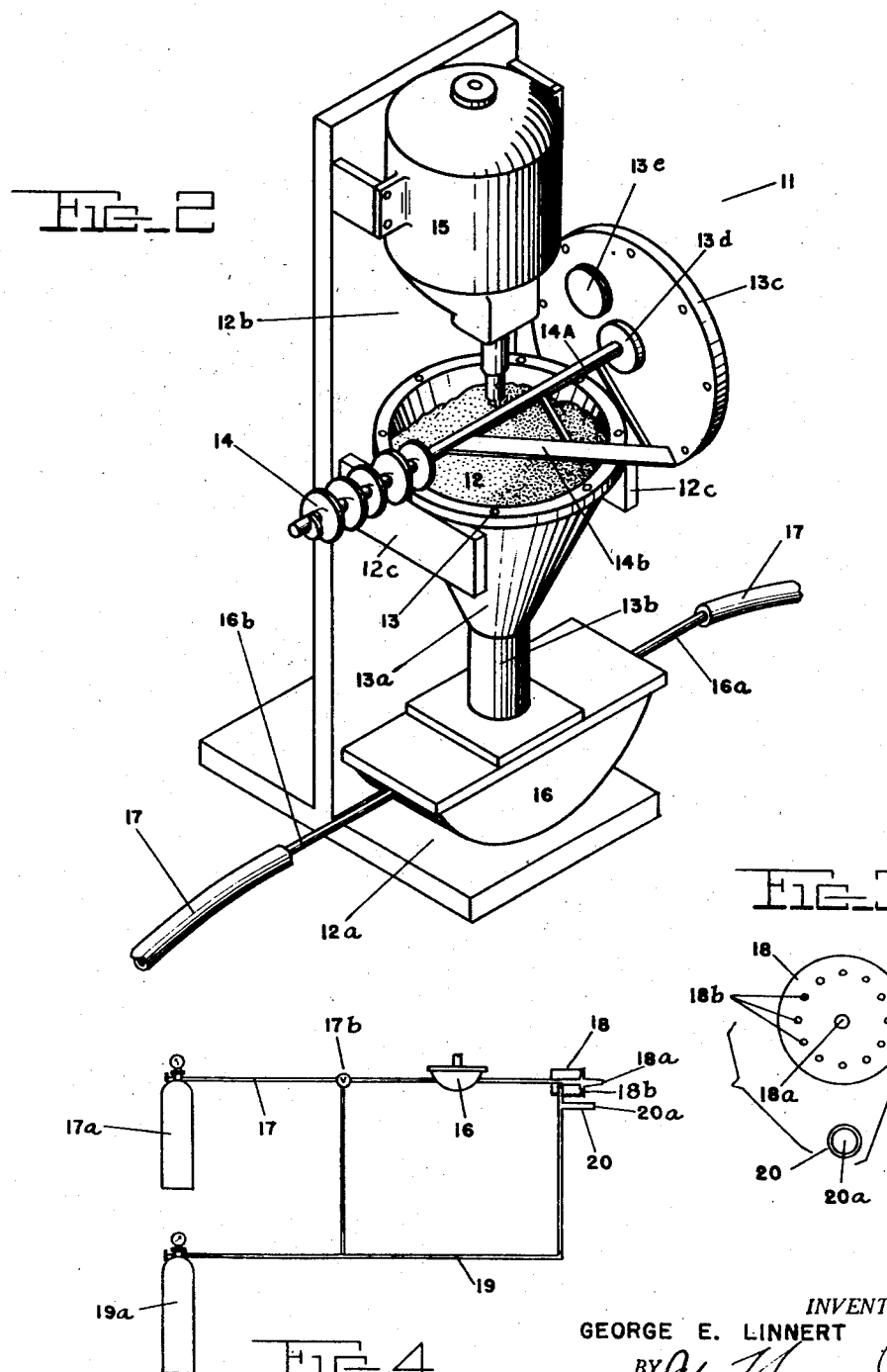
INVENTOR.
GEORGE E. LINNERT Patented Nov. 23, 1948

2,454,325

UNITED STATES PATENT OFFICE 2,454,325

COMBUSTION CUTTING OF STAINLESS STEEL

George Edwin Linnert, Baltimore, Md., assignor, by mesne assignments, to Armco Steel Corporation, a corporation of Ohio Application February 17, 1945, Serial No. 578,535

7 Claims. (Cl. 148—9)

This invention relates to the gas cutting of metallic compositions, especially stainless alloy steel compositions, and more particularly to a method for effecting gas cutting operation.

One of the objects of my invention is the provision of a rapid, efficient and economical method of cutting metals, such as stainless steel, with cutting gas.

Another object is the cutting of refractory oxygen cut-resistant metallic compositions in an economical, rapid and practical manner employing a minimum of equipment and using readily available materials.

Other objects in part will be obvious and in part will be pointed out hereinafter.

The invention accordingly consists in the various operational steps, and in the relation of one or more of the same to one or more of the others, as described herein, the scope of the application of which is indicated in the following claims.

In the accompanying drawing illustrating certain features of my invention,

Figure 1 is a perspective of my torch cutting apparatus,

Figure 2 is a similar view, in which, however, a portion of the apparatus is disassembled in order to better illustrate certain aspects of the same, Figure 3 is a detached view of a portion of the apparatus shown in Figures 1 and 2, and Figure 4 is a schematic diagram illustrating the operative features of the apparatus.

Like reference characters denote like parts throughout the several views.

As conducive to a clearer understanding of certain features of my invention it may be noted at this point that the stainless steels resist ordinary gas cutting techniques heretofore successfully employed on the carbon steels. Those metals which are more resistant, as to ordinary oxy-acetylene torch cutting, usually acquire a surface condition as a result of heating which serves to insulate the underlying metal from the torch flame, or in some other fashion display a low thermal conductivity characteristic which tends to reduce efficiency of heating with a torch.

A number of distinctive flame cutting techniques, such as preheating of the metal followed by patterned movement of the torch cutting tip or head, accordingly have been resorted to in the effort to expedite cutting operations as applied to the cut-resistant metals. Even in view of efforts heretofore made, however, gas cutting of most of the recognized cut-resistant metals still presents an outstanding number of practical difficulties among which are excessive consumption of fuel gas and oxygen, slowness of cutting operation and the failure to obtain cuts particularly those which are continuous and otherwise satisfactory.

Considering more especially the stainless steels, these alloy steels contain chromium in amount from about 10% to 35% or more. In addition they may contain one or more of a number of ingredients, such as manganese, silicon, aluminum, copper, nickel, molybdenum, cobalt, tungsten, or titanium, vanadium, columbium, tantalum, or sulphur, zirconium, phosphorus or tellurium, for special purposes. Because of the large amount of chromium present in stainless steel, and also because of certain other refractory metals when included as modifying ingredients, an exceptionally viscous refractory slag appears on the steel during gas cutting operations as, for example, during flame scarfing or flame machining operations.

It seems that this slag to an important extent consists of various oxides of chromium, possibly along with oxides derived from other refractory metals when these are present in the steel. The slag forms a blanket over the stainless steel surface and will not discharge readily from those points exposed to cutting but remains as an insulator against further oxidation by the torch cutting stream. The protective slag afforded is so efficient that stainless steels actually cannot be cut with a conventional torch; instead a kerf merely can be melted and swept or blown out usually by some particular pattern of movement imparted to the torch head and flame. This is a laborious operation and at the same time consumes a considerable amount of fuel gas and oxygen.

On the other hand, the stainless steels have a thermal conductivity which is somewhat low, and thus there is need for maintaining the steels hot locally to promote continued reaction with the gas cutting stream. It is found, however, that the insulating viscous slag blanket impedes localized heating as with the torch, and, moreover, is difficult to remove in time to permit continued and efficient cutting operations.

An object of my invention accordingly is the provision of a simple, direct and highly effective method for cutting metallic compositions with a oxygen and fuel gas torch, especially alloy steels of high-chromium contents, which method is rapid of performance and requires a minimum of fuel gas and oxygen in achieving the desired cutting operations.

Referring now more particularly to the practice of my invention I find that stainless steel as in the form of ingots, billets, bars, plates, clad metal, welded pieces or filler for welds, scrap, or rolling mill cobbles, are readily cut, scarfed or trimmed by introducing oxygen, of usual high grade employed for gas cutting, and a fluxing agent preferably comprising one or more carbonates of sodium, that is, sodium carbonate or sodium bicarbonate, at the points to be cut while the metal is sufficiently hot to react with the oxygen. The oxygen is directed in a cutting jet or stream, as from an oxy-acetylene cutting head or oxygen lance, upon the stainless steel or like metal at points to be cut. At the same time the fluxing agent, which is essentially one serving to flux out troublesome slag formed as an incident to the cutting operations, is introduced to the points of cutting preferably in mixture with the oxygen stream. A preferred embodiment of my cutting apparatus, including means for introducing fluxing material to the metal while cutting, is more particularly described hereinafter.

With the aid of the flux, particularly one containing sodium carbonate, sodium bicarbonate or both, in abundant quantities, the oxygen continuously impinges on unprotected metal and the cutting operation thus progresses in a thoroughly satisfactory manner. As a further step to ensure continued cutting, the stainless steel or like cut-resistant metal is maintained in a preheated condition, as by means of an intense preheating flame on the cutting head, in advance of the oxygen stream.

An illustrative embodiment of apparatus employed in the practice of my cutting method includes an oxy-acetylene cutting torch 10 (see for examples Figures 1 and 2 of the drawing) and a mechanical unit 11 for housing and supplying powdered slag-fluidifying flux 12 to the metal in the immediate vicinity of the cutting operations. The mechanical unit in the embodiment noted includes an inverted T-shaped support of which there is a horizontal base member 12a and an upright member 12b. A flux receptacle 13 comprising a vertically disposed funnel 13a is firmly bolted through brackets 12c to the upright member 12b of the support. At lower end the receptacle is provided with a tube or spout 13b having a substantially cylindrical bore in which a screw conveyor 14 is snugly housed for vertical discharge of flux from the receptacle proper. The conveyor includes a power shaft 14a which is connected in driven relation with an electric motor 15 also mounted on upright member 12b of the support 12.

The flux receptacle is closed off at top by means of a cover plate 13c which is sealed and bolted over the receptacle proper and which provides a journal 13d, preferably gas tight, for the screw conveyor power shaft. With the receptacle and on the power shaft as a part of the conveyor mechanism, a sweep arm or blade 14b is mounted for rotation, adjacent to the inside conical surface of the receptacle for sweeping flux down to the conveyor screw and thus ensuring continued discharge. The supply of flux may be replenished from time to time by removing a threaded plug 13e from a corresponding threaded hole in the receptacle top.

A gas and flux receiver 16 disposed below the receptacle 13 provides a confined chamber into which the receptacle spout 13b empties for discharging flux from the screw conveyor. Then, too, the receiver mixing chamber is connected through gas inlet port 16a and gas outlet port 16b of the receiver in a gas supply line of the cutting torch 10, preferably in the oxygen line 17, so as to form a part of the same. It will be understood (see also Figure 4) that the oxygen line 17 leads from a suitable source of substantially pure oxygen supply such as tank 17a to the torch cutting head 18 and empties through a cutting gas orifice 18a in the head. At the same time it will be understood that oxygen may be tapped, as at valve 17b in a manner well known in the cutting torch art, to fuel gas supply line 19 for mixing with acetylene afforded from tank 19a. The flux receiver 16 preferably is connected in oxygen line 17 between the cutting head and any point of tapping oxygen to the fuel gas line as illustrated in the accompanying drawing.

The torch 10 employed is provided with a plurality of gas outlets of number and dimensions sufficient to issue fuel gas from supply line 19 for heating the metal to cutting temperature, as to a dull red heat. Preferably (see Figure 3), at least some fuel gas outlets 18b in the head 18 with or without the aid of outlets in one or more supplementary torch heads, for example outlet 20a in oxy-acetylene welding torch head 20 connected for fuel supply with gas line 19, are positioned for directing a sufficient quantity of gas for preheating the metal to cutting temperature in advance of the oxygen cutting stream. The advanced fuel gas ports tend to overcome poor thermal conductivity characteristics and the related problem of heating metals such as stainless steel in continued cutting operations.

In preheating metal to be cut, fuel gas preferably consisting of acetylene and oxygen is supplied to the torch head 18 from tanks 17a and 19a and is ignited in streams issuing from ports 18b with or without the aid of supplementary flame from head 20. The heating flame thus provided is directed upon the metal at least along a desired path of cutting to impart a preheat which will support combustion of the metal with the oxygen cutting stream.

To cut the metal (see Figures 1 and 4), substantially pure oxygen is supplied to the torch cutting head 18 from tank 17a and is made to impinge in a stream from port 18a upon the preheated metal along the desired path of cutting. Powdered flux, illustratively sodium carbonate, preferably is continuously introduced into the oxygen employed for cutting by energizing the driving motor 15 of the screw conveyor 14. The conveyor is rotated as through power shaft 14a in such direction as to feed the flux from receptacle 13 through spout or tube 13a into the receiver 16. Oxygen coursing from the supply tank to the cutting head picks up the flux and carries the same in suspension to the metal.

The flux suspended in the oxygen cutting stream mixes with the slag, formed as an incident to cutting, and as a result gives a relatively fluid slag which discharges freely to permit continuous cutting. Meanwhile, as a further measure to ensure continuous cutting, the torch preheating flame preferably is played upon the metal in advance of the point of cutting to bring that metal up to cutting temperature. The preheated metal then is cut with the oxygen stream in such fashion as to make the preheating and cutting operations continuous.

Thus it will be seen that there is provided in this invention a method for cutting stainless steel, as well as metals having oxygen cut-resistant qualities typical of cast iron, aluminum or alloys of aluminum, in which the various objects hereinbefore noted together with many thoroughly practical advantages are successfully achieved. It will be noted that the process enables effective cutting all with a minimum consumption of fuel gas and cutting oxygen of certain metals which heretofore have not proved practical to cut with gas, and that the apparatus and fluxing materials employed are highly suited for achieving the cuts desired.

As many possible embodiments may be made of my invention and as many changes may be made in the embodiments hereinbefore set forth, it is to be understood that all matter described and/or illustrated herein is to be interpreted as illustrative and not as a limitation.

I claim:

1. In a method of combustion-cutting stainless steel, the art which includes heating the metal to be cut to a temperature sufficiently high for supporting combustion with an oxygen cutting stream, injecting into said oxygen cutting stream a flux consisting of at least one carbonate of the group sodium carbonate and sodium bicarbonate, and subjecting said heated metal to the oxygen cutting stream and included flux.

2. In a method of combustion-cutting stainless steel, the art which includes preheating the metal along a desired path of cutting to a temperature sufficiently high for supporting combustion with an oxygen cutting stream, and subjecting said cutting path to the cutting stream and a flux consisting of at least one finely divided carbonate of the group consisting of sodium carbonate and sodium bicarbonate.

3. In a method of combustion-cutting stainless steel, the art which includes preheating the metal along a desired path of cutting by an advance pre-heating flame, and subjecting the preheated metal at points to be cut to an oxygen cutting stream in which there also is included a flux consisting of sodium carbonate.

4. In a method of combustion-cutting stainless steel, the art which includes preheating the metal along a desired path of cutting by an advance pre-heating flame, and subjecting the preheated metal at points to be cut to an oxygen cutting stream in which there is present a flux consisting of sodium bicarbonate.

5. In a method of combustion-cutting stainless steel at a temperature sufficiently high to support combustion with an oxygen cutting stream, the art which includes subjecting the heated metal at the points to be cut to said oxygen cutting stream and flux consisting of at least one powdered carbonate of the group consisting of sodium carbonate and sodium bicarbonate.

6. In a method of combustion-cutting stainless steel, the art which includes, heating the steel at the point to be cut to a temperature sufficiently high to support combustion with an oxygen cutting stream, supplying the oxygen for said cutting stream with a flux consisting of carbonate of the group sodium carbonate and sodium bicarbonate, agitating said flux prior to supplying the same to said oxygen, and subjecting said heated steel to said oxygen cutting stream and included flux.

7. In a method of combustion-cutting stainless steel at a temperature sufficiently high to support combustion with an oxygen cutting stream, the art which includes, continuously injecting into said oxygen a powdered flux consisting of carbonate from the group sodium carbonate and sodium bicarbonate, and subjecting the stainless steel to said oxygen cutting stream with included flux.

GEORGE EDWIN LINNERT.

REFERENCES CITED

The following references are of record in the file of this patent:

UNITED STATES PATENTS

| Number | Name | Date |
|---|---|---|
| 346,611 | Root | Aug. 3, 1886 |
| 968,350 | Harrison | Aug. 23, 1910 |
| 1,013,379 | Dunn | Jan. 2, 1912 |
| 1,256,429 | Beaulieau | Feb. 12, 1918 |
| 1,412,656 | Jenkins | Apr. 11, 1922 |
| 1,441,094 | Jenkins | Jan. 2, 1923 |
| 1,494,003 | Malcher | May 13, 1924 |
| 1,728,104 | Claude | Sept. 10, 1929 |
| 2,205,890 | Nicholson et al. | June 25, 1940 |
| 2,110,781 | Wagner | Mar. 8, 1938 |
| 2,158,489 | Walker | May 10, 1939 |
| 2,181,095 | Ness | Nov. 21, 1939 |
| 2,286,191 | Aitchison | June 16, 1942 |
| 2,317,936 | Nicholson et al. | Apr. 27, 1943 |
| 2,327,496 | Root | Aug. 24, 1943 |
| 2,366,787 | Hoffman | Jan. 9, 1945 |

FOREIGN PATENTS

| Number | Country | Date |
|---|---|---|
| 116,690 | Great Britain | Jan. 2, 1919 |

OTHER REFERENCES

"The Welding Encyclopedia," 10th edition, 1941; The Welding Engineer Publishing Co., Chicago, Ill., pages 170–175 and 252.

"The Oxy-acetylene Handbook," 1943; the Linde Air Products Company, N. Y. C., page 438.